(12) United States Patent
Chen et al.

(10) Patent No.: US 8,766,942 B2
(45) Date of Patent: Jul. 1, 2014

(54) ELECTRONIC DEVICE

(75) Inventors: Yin-Yu Chen, New Taipei (TW);
Yao-Shun Tseng, New Taipei (TW);
Joseph Chong, New Taipei (TW)

(73) Assignee: Wistron Corporation, New Taipei (TW)

( * ) Notice: Subject to any disclaimer, the term of this patent is extended or adjusted under 35 U.S.C. 154(b) by 180 days.

(21) Appl. No.: 13/594,435

(22) Filed: Aug. 24, 2012

(65) Prior Publication Data
US 2013/0222281 A1 Aug. 29, 2013

(30) Foreign Application Priority Data

Feb. 24, 2012 (TW) .............................. 101106419 A

(51) Int. Cl.
*G06F 3/041* (2006.01)
(52) U.S. Cl.
USPC .......................................... 345/173; 345/157
(58) Field of Classification Search
CPC ................ G06F 3/041; G06F 3/0488
USPC ................ 345/157, 173–177, 209, 419, 690; 349/12
See application file for complete search history.

(56) References Cited

U.S. PATENT DOCUMENTS

| | | | | |
|---|---|---|---|---|
| 8,587,544 B2 * | 11/2013 | Kim et al. | ...................... | 345/173 |
| 2011/0074775 A1 * | 3/2011 | Shibutani et al. | ............. | 345/419 |
| 2013/0002661 A1 * | 1/2013 | Tanaka et al. | ................. | 345/419 |
| 2013/0271675 A1 * | 10/2013 | Misaki | ............. | 349/12 |
| 2014/0028594 A1 * | 1/2014 | Chen et al. | .................... | 345/173 |

* cited by examiner

*Primary Examiner* — Andrew Sasinowski
(74) *Attorney, Agent, or Firm* — McClure, Qualey & Rodack, LLP

(57) ABSTRACT

An electronic device includes: a touch controller, periodically providing a touch sensing signal in a touch sensing period to a touch display panel for touch detection; a control core, periodically switching a level of a parallax switching signal; a parallax switching barrier, for respectively barricading a right-eye display zone and a left-eye display zone on the touch display panel in a left-eye display period and a right-eye display period in response to the parallax display switching signal; and an interference shielding module, for delaying the level switching of the parallax switching signal of the control core when a starting point of the touch sensing signal is detected, so as to prevent the level switching of the parallax switching signal from being triggered in the touch sensing period.

6 Claims, 5 Drawing Sheets

ELECTRONIC DEVICE

This application claims the benefit of Taiwan application Serial No. 101106419, filed Feb. 24, 2012, the subject matter of which is incorporated herein by reference.

BACKGROUND OF THE INVENTION

1. Field of the Invention

The invention relates in general to an electronic device, and more particularly to an electronic device provided with a touch display panel with a three-dimensional (3D) display function.

2. Description of the Related Art

As the technology continuously progresses in the modern world, touch display panels are developed and prevail in various electronic products. In current techniques, capacitive touch display panels are a mainstream in touch display panels. A capacitive touch display panel includes a substrate made of transparent electrodes. The transparent electrodes sense a touch event performed by a conductor (e.g., a user finger) approaching the substrate, and correspondingly generate a detectable electronic signal. A touch display panel can then be implemented through detecting and converting the detectable electronic signal.

A compact appearance is one of the key development trends for handheld electronic devices. As the size of handheld electronic devices becomes smaller, manufacturers of handheld electronic device inevitably encounter a problem of mutual interferences among electronic signals. Therefore, under circumstances of limited hardware resources, it is a goal of manufacturers to provide an appropriate circuit design for reducing mutual interferences among electronic signals of handheld electronic devices.

SUMMARY OF THE INVENTION

According to an aspect of the present invention, an electronic device is provided. The electronic device includes a touch display panel, a touch controller, a control core, a parallax switching barrier and an interference shielding module. The touch controller, coupled to the touch display panel, periodically provides a touch sensing signal in a touch sensing period to the touch display panel for detecting a touch operation triggered on the touch display panel. The control core periodically switches a level of a parallax switching signal. The parallax switching barrier is disposed on the touch display panel in parallel, and is controlled by the parallax switching signal to barricade at least one right-eye display zone on the touch display panel in a left-eye display period and to barricade at least one left-eye display zone on the touch display panel in a right-eye display period. The interference shielding module detects the touch sensing signal to identify a first starting point of the touch sensing signal, and provides a control signal to drive the control core to delay the level switching of the parallax switching signal when the first starting point of the touch sensing signal is detected, so as to prevent the level switching of the parallax switching signal from being triggered in the touch sensing period.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
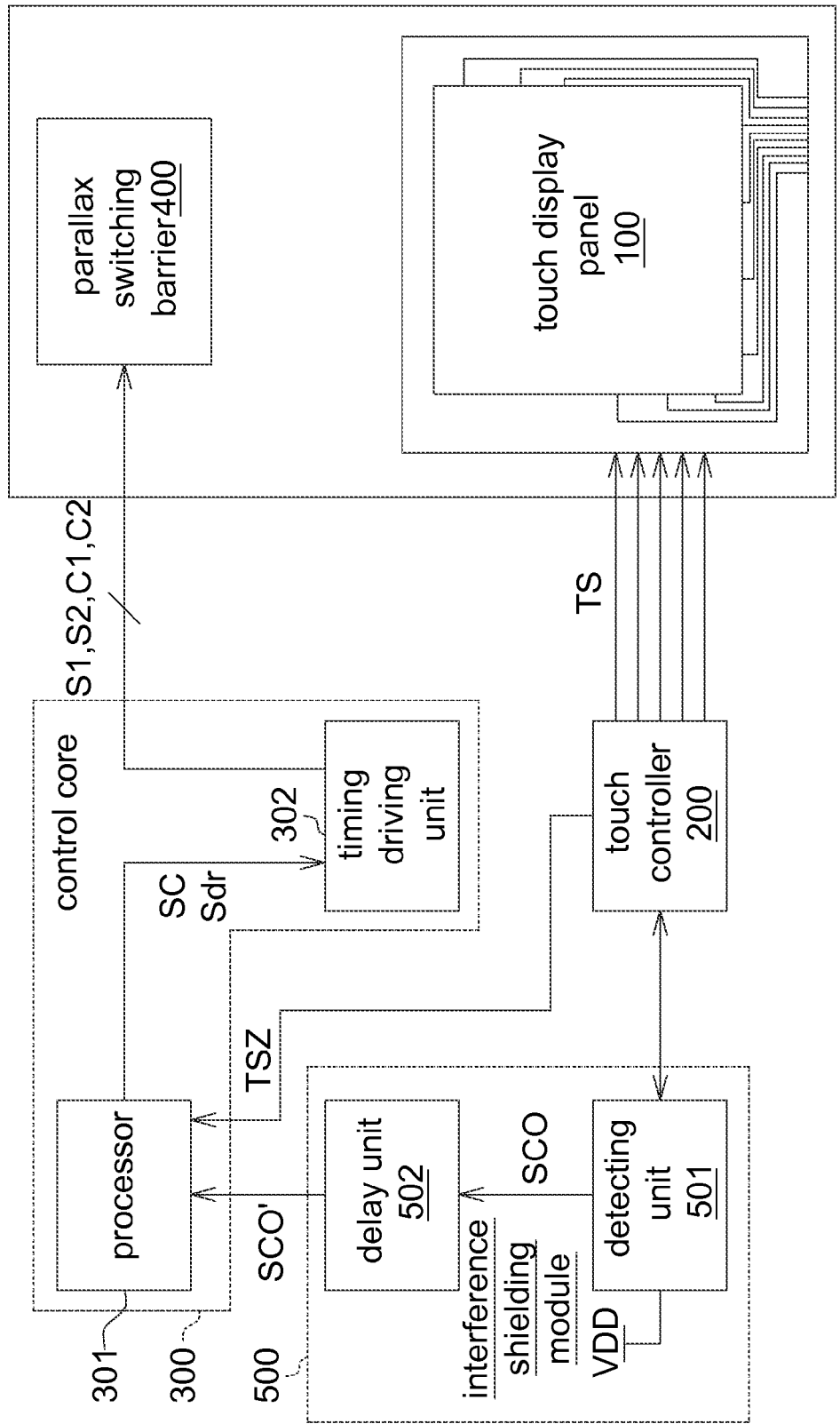
FIG. 1 is a block diagram of an electronic device according to an embodiment of the present invention.

FIG. 1 shows a block diagram of an electronic device according to an embodiment of the present invention. For example, an electronic device 1 of the embodiment is a handheld electronic device, such as a mobile phone, a personal digital assistant (PDA), a mobile game console, or a mobile navigation device.

The electronic device 1 includes a touch display panel 100, a touch controller 200, a control core 300, a parallax switching barrier 400 and an interference shielding module 500. The touch controller 200 is coupled to the touch display panel 100 and the interference shielding module 500. The control core 300 is coupled to the interference shielding module 500 and the parallax switching barrier 400.

Figure 2:
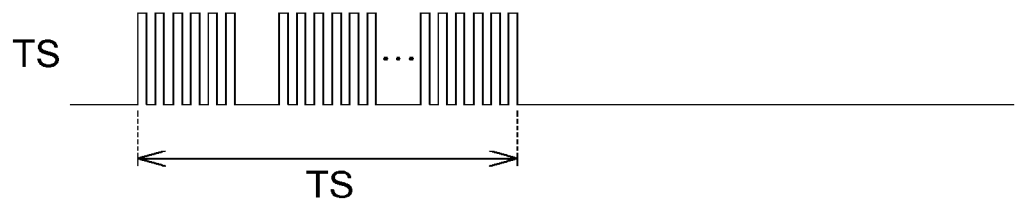
FIG. 2 is a timing diagram of a touch sensing signal TS in FIG. 1.

For example, the touch display panel 100 is a common liquid-crystal display (LCD) or a capacitive touch panel. The capacitive touch panel is provided with a substrate made of transparent electrodes. The transparent electrodes sense a touch event triggered by a conductor (e.g., a user finger) approaching the substrate to correspondingly provide a detectable electronic signal. The touch controller 200 periodically provides a touch sensing signal TS to the touch display panel 100 in a touch sensing period T_S, so as to detect a touch operation triggered on the touch display panel 100. The touch controller 200 further provides a sensing electronic signal TSE to the control core 300 according to the foregoing touch detection. For example, the touch sensing signal TS has a timing as shown in FIG. 2. The touch sensing signal TS is formed by multiple pulse signals having a cycle time of 14.8 ms, for example.

Figure 3:
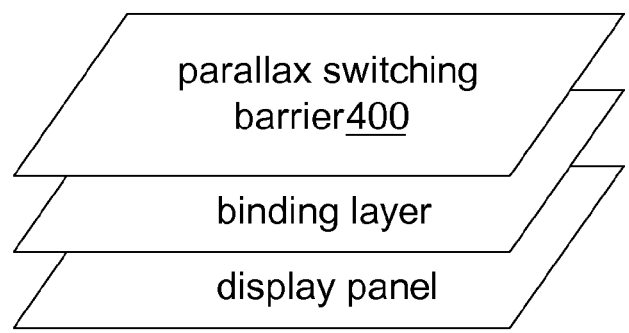
FIG. 3 is a schematic diagram of a parallax switching barrier 400 in FIG. 1.

FIG. 3 shows a schematic diagram of the parallax switching barrier 400 in FIG. 1. For example, the parallax switching barrier 400 may be implemented by a twisted nematic (TN) LCD module, which is disposed on the display panel in parallel via a binding layer to accordingly define left-eye display zones and right-eye display zones on the display panel.

Figure 4A:
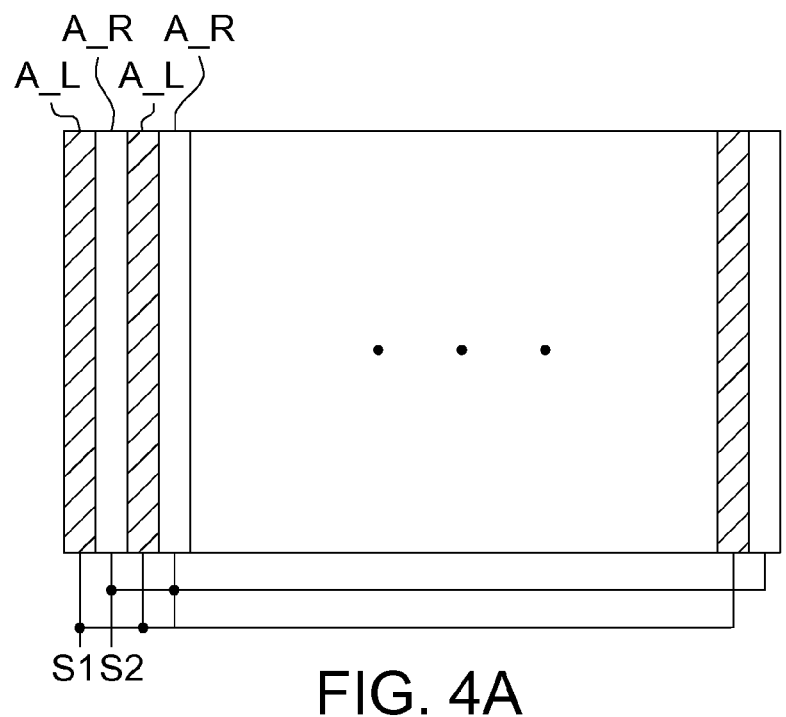
FIG. 4A is a schematic diagram of left-eye and right-eye display zones on a display panel.

FIG. 4A shows a schematic diagram of left-eye and right-eye displays zones on a display panel. When the display panel is in a landscape mode, odd pixel columns of the display panel are defined as left-eye display zones (i.e., shaded pixel columns in FIG. 4A) and even pixel columns of the display panel are defined as right-eye display zones (i.e., blank pixel columns in FIG. 4A).

Figure 4B:
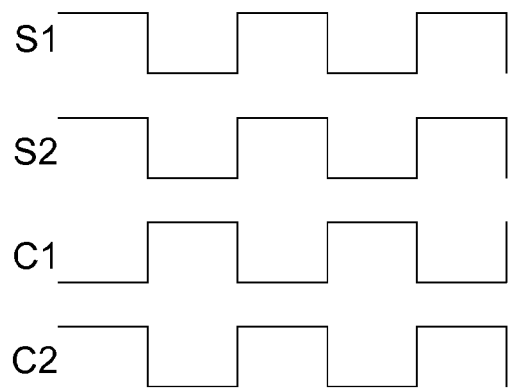
FIG. 4B is a timing diagram of parallax switching signals in FIG. 4A.

Further, the parallax switching barrier 400 is controlled by parallax switching signals S1 and S2, so as to barricade the right-eye display zones A_R on the touch display panel 100 in a left-eye display period T_L and to barricade the left-eye display zones A_L on the touch display panel 100 in a right-eye display period T_R. Accordingly, through the parallax switching of the left-eye and right-eye display periods T_L and T_R, the display panel of the embodiment is allowed to correspondingly display a three-dimensional (3D) image in the landscape mode. For example, signal waveforms of the parallax switching signals S1 and S2 are as shown in FIG. 4B. Also shown in FIG. 4B, parallax switching signals C1 and C2 are parallax switching signals corresponding to a landscape mode of the display panel, and correspond to substantially the same signal waveforms when the display panel operates in the landscape mode.

Figure 5A:
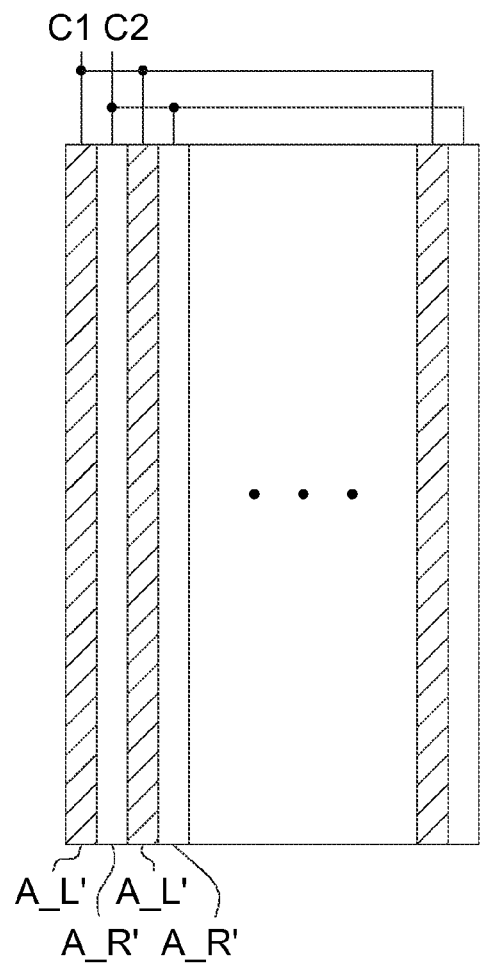
FIG. 5A is another schematic diagram of left-eye and right-eye display zones on a display panel.

FIG. 5A shows another schematic diagram of the parallax switching barrier 400 in FIG. 1. When the display panel is in the portrait mode, the odd pixel rows of the display panel are defined as left-eye display zones A_L' (i.e., shaded pixel rows in FIG. 5A), and the even pixel rows of the display panel are defined as right-eye display zones A_R' (i.e., blank pixel rows in FIG. 5A).

Figure 5B:
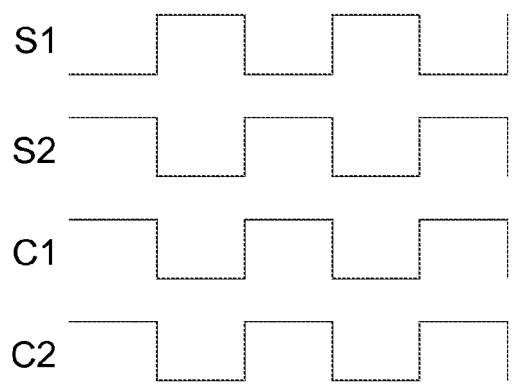
FIG. 5B is a timing diagram of parallax switching signals in FIG. 5A.

Further, the parallax switching barrier 400 is controlled by the parallax switching signals C1 and C2, so as to barricade the right-eye display zones A_R' on the touch display panel 100 in the left-eye display period T_L and to barricade the left-eye display zones A_L' on the touch display panel 100 in the right-eye display period T_R. Accordingly, through the parallax switching of the left-eye and right-eye display periods T_L and T_R, the display panel of the embodiment is allowed to correspondingly display a 3D image in the portrait mode. For example, signal waveforms of the parallax switching signal C1 and C2 are as shown in FIG. 5B. For the parallax switching signals S1 and S2 corresponding to the portrait mode of the display panel, the parallax switching signals S1 and S2 correspond to substantially the same signal waveforms when the display panel operates in the portrait mode.

The control core 300 periodically switches levels of the parallax switching signal S1, S2, C1 and C2 to drive the parallax switching barrier 400. Further, the control core 300 includes a processor 301 and a timing driving unit 302. For example, the processor 301 is a central processor of the electronic device 1 for controlling other circuits in the electronic device 1. The processor 301 provides a clock signal Sc, and provides a driving signal Sdr in response to a control signal SCO.

The timing driving unit 302 periodically switches the levels of the parallax switching signals S1, S2, C1 and C2 with reference to the clock signal Sc to accordingly generate the parallax switching signals S1, S2, C1 and C2. The timing driving unit 302 further triggers front edges of the parallax switching signals S1, S2, C1 and C2. For example, the timing driving unit 302 may be implemented by a flip-flop, which provides the parallax switching signals S1, S2, C1 and C2 through its output and its inverted output with reference to the clock signal Sc.

Therefore, through the touch detection performed by the touch controller 200 and the touch display panel 100 as well as the parallax switching performed by the control core 300 and the parallax switching barrier 400, the electronic device 1 of the embodiment effectively implements a 3D touch display.

However, the level switching of the parallax switching signals S1, S2, C1 and C2 frequently causes interference on the touch sensing signal TS, such that an error in the touch detection of the touch controller 200 and the touch display panel 100 may be incurred. To solve the signal interference, the electronic device 1 of the embodiment selectively delays the parallax switching signals S1, S2, C1 and C2 provided by the core controller 300 through the interference shielding module 500, so as to prevent the level switching from interfering the touch sensing signal TS.

Figure 6:
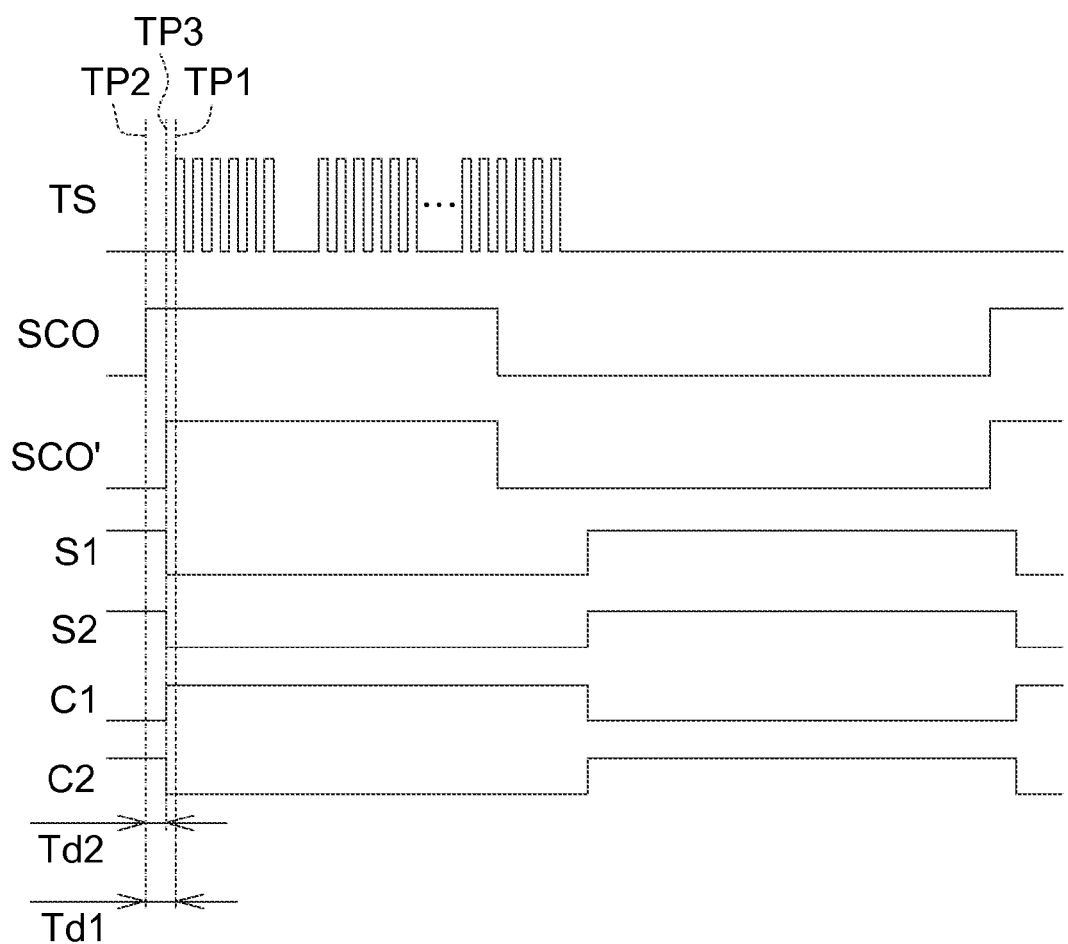
FIG. 6 is a timing diagram of signals associated with the electronic device in FIG. 1.

The interference shielding module 500 detects the touch sensing signal TS to identify a starting point TP1 of the touch sensing signal TS, as shown in FIG. 6. When the starting point TP1 is detected, the interference shielding module 500 further provides the driving signal Sdr to drive the control core 300 to delay the level switching of the parallax switching signals S1, S2, C1 and C2, so as to prevent the level switching of the parallax switching signals S1, S2, C1 and C2 from being triggered in the touch sensing period T_S. Accordingly, the interference shielding module 500 effectively prevents the parallax switching signals S1, S2, C1 and C2 from interfering and altering the touch sensing signal TS.

For example, the interference shielding module 500 includes a detecting unit 501 and a delay unit 502. The detecting unit 501 detects the starting point TP1 of the touch sensing signal TS, and provides an indication signal SCO at a starting point TP2 before the starting point TP1 is triggered. Compared to the starting point TP2, the starting point TP1 is delayed by a delay period Td1. For example, through measuring an electric current change in the touch controller 200 when the touch controller 200 drives the touch display panel 100, the detecting unit 501 correspondingly identifies the indication signal SCO that is substantially a digital cycle signal.

After receiving the indication signal SCO, the delay unit 502 delays the indication signal SCO by a delay period Td2 to generate a control signal SCO', and outputs the control signal SCO' to the core controller 300. In response to the control signal SCO', the processor delays the starting point TP2 by a delay period Td2, and provides the driving signal Sdr to correspondingly drive the timing driving unit 302 to switch the levels of the parallax switching signals S1, S2, C1 and C2 at a corresponding time point TP3.

In an operation example, a length of the delay period Td2 is substantially smaller than a length of the delay period Td1. In other words, before the starting point TP1 (i.e., the starting point of the touch sensing period T_S), the processor 301 drives the timing driving unit 302 to switch the levels of the parallax switching signals S1, S2, C1 and C2. Thus, the interference shielding module 500 effective prevents the parallax switching signals S1, S2, C1 and C2 from being triggered in the touch sensing period T_S.

In another operation example, the delay period Td2 is substantially greater than a sum of the delay period Td1 and the touch sensing period T_S. In other words, after the touch sensing period T_S ends, the processor 301 correspondingly drives the timing driving unit 302 to switch the levels of the parallax switching signals S1, S2, C1 and C2. Hence, the interference shielding module 500 of the embodiment also effectively prevents the parallax switching signals S1, S2, C1 and C2 from being triggered in the touch sensing period T_S.

In conclusion, an electronic device of an embodiment includes a touch display panel and a touch controller. The touch controller periodically provides a touch sensing signal to the touch display panel to detect a touch operation triggered on the touch display panel. The electronic device of the embodiment further includes a parallax switching barrier. The parallax switching barrier is controlled by parallax switching signals to selectively barricade left-eye and right-eye display zones on the touch display panel, so as to display a 3D image to a user. The electronic device of the embodiment further includes an interference shielding module. When a starting point of the touch sensing signal is detected, the interference shielding module provides a control signal to delay a switching operation of the parallax switching signals, so as to prevent the level switching of the parallax switching signals from being triggered in a touch sensing period and thus preventing the parallax switching signals from interfering the touch sensing signal. Accordingly, compared to a conventional electronic device, the electronic device of the embodiment offers an advantage effectively preventing mutual interference between the parallax switching signals and touch sensing signal in the electronic device.

In an alternative embodiment, in contribution to the interference shielding module in the electronic device, the touch sensing signal of a capacitive touch panel is prevented from interference coming from the parallax switching signals of the parallax switching barrier. Thus, compared to a conventional electronic device, the electronic device of the embodiment eliminates an insulation layer between the parallax switching barrier and the capacitive touch panel to further reduce a thickness of the electronic device.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electronic device, comprising:
    a touch display panel;
    a touch controller, coupled to the touch display panel, periodically providing a touch sensing signal to the touch display panel in a touch sensing period to detect a touch operation triggered on the touch display panel;
    a control core, periodically switching a level of a parallax switching signal;
    a parallax switching barrier, disposed on the touch display panel in parallel, being controlled by the parallax switching signal to respectively barricade at least one right-eye display zone on the touch display panel in a left-eye display period, and to barricade at least one left-eye display zone on the touch display panel in a right-eye display period; and
    an interference shielding module, for detecting the touch sensing signal to identify a first starting point of the touch sensing signal, and providing a control signal for driving the control core to delay the switching of the parallax signal when the first starting point is detected, so as to prevent the level switching of the parallax switching signal from being triggered in the touch sensing period.

2. The electronic device according to claim 1, wherein the interference shielding module comprises:
    a detecting unit, for detecting the first starting point of the touch sensing signal, and providing an indication signal at a second starting point before the first starting point is triggered; wherein, the first starting point is delayed by a first delay period compared to the second starting point.

3. The electronic device according to claim 2, wherein the interference shielding module comprises:
    a delay unit, when receiving the indication signal, for delaying the control signal by a second delay period and outputting the delayed control signal to the control core;
    wherein, in response to the delayed control signal, the control core further switches the level of the parallax switching signal at a time point of delaying the second starting point by the second delay period.

4. The electronic device according to claim 3, wherein the second delay period is substantially smaller than the first delay period, and the control core accordingly switches the level of the parallax switching signal before the first starting point.

5. The electronic device according to claim 3, wherein the second delay period is substantially greater than a sum of the first delay period and the touch sensing period, and the control core accordingly switches the level of the parallax switching signal at a time point after delaying the second starting point by the second delay period.

6. The electronic device according to claim 1, wherein the control core comprises:
    a processor, for providing a clock signal; and
    a timing driving unit, for periodically switching the level of the parallax switching signal with reference to the clock signal;
    wherein, when receiving the control signal, the processor further provides a driving signal for driving the timing driving unit to switch the level of the parallax switching signal.

* * * * *